United States Patent [19]
Willard, Jr.

[11] Patent Number: 5,511,599
[45] Date of Patent: Apr. 30, 1996

[54] RUN-FLAT TIRE WITH THREE CRESCENT-SHAPED REINFORCING MEMBERS

[75] Inventor: Walter L. Willard, Jr., Greenville, S.C.

[73] Assignee: Michelin Recherche et Technique S.A., Granges-Paccot, Switzerland

[21] Appl. No.: 418,969

[22] Filed: Apr. 7, 1995

Related U.S. Application Data

[63] Continuation-in-part of Ser. No. 182,995, Jan. 13, 1994, Pat. No. 5,427,166.

[51] Int. Cl.[6] .............................. B60C 3/00; B60C 15/04; B60C 15/06; B60C 17/06
[52] U.S. Cl. ........................ 152/454; 152/517; 152/539; 152/540; 152/543; 152/544; 152/546; 152/547; 152/550; 152/554; 152/555
[58] Field of Search .................................. 152/454, 517, 152/526, 531, 536, 539, 540, 543, 544, 546–550, 553, 557

[56] References Cited

U.S. PATENT DOCUMENTS

| | | |
|---|---|---|
| 4,067,374 | 1/1978 | Alden et al. . |
| 4,287,924 | 9/1981 | Deck et al. . |
| 4,554,960 | 11/1985 | Pompier . |
| 4,779,658 | 10/1988 | Kawabata et al. . |
| 4,917,164 | 4/1990 | Uchikubo et al. . |
| 5,217,549 | 6/1993 | Johnson . |
| 5,238,040 | 8/1993 | Ghilardi . |
| 5,263,526 | 11/1993 | Dare et al. . |
| 5,295,526 | 3/1994 | Tokieda et al. . |
| 5,299,615 | 4/1994 | Ataka . |
| 5,368,082 | 11/1994 | Dare et al. . |

FOREIGN PATENT DOCUMENTS

| | | |
|---|---|---|
| 0385192 | 9/1990 | European Pat. Off. . |
| 2469297 | 5/1981 | France . |
| 3-143710 | 6/1991 | Japan . |

*Primary Examiner*—Adrienne C. Johnstone
*Attorney, Agent, or Firm*—Russell W. Warnock; Robert R. Reed

[57] ABSTRACT

The run-flat tire includes thickened load bearing sidewall portions, a belt package plus a cap ply, three pairs of sidewall rubber crescent-shaped reinforcing members, a specially designed bead seat area with a rim seat ply and three carcass layers. The three carcass layers are positioned between the crescent-shaped members in each load bearing sidewall.

23 Claims, 4 Drawing Sheets

COMPARATIVE

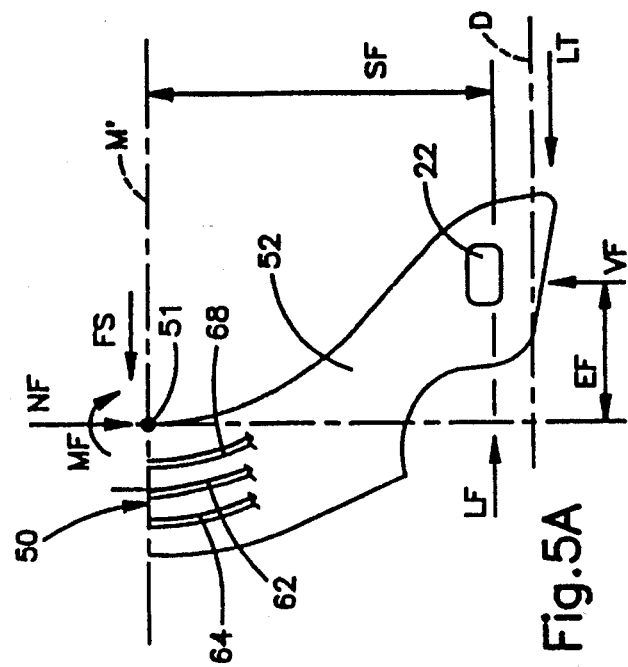
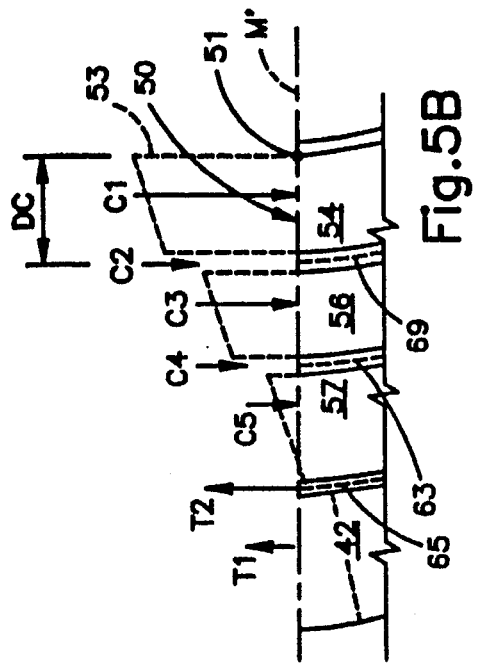
Fig.5A
Fig.5B
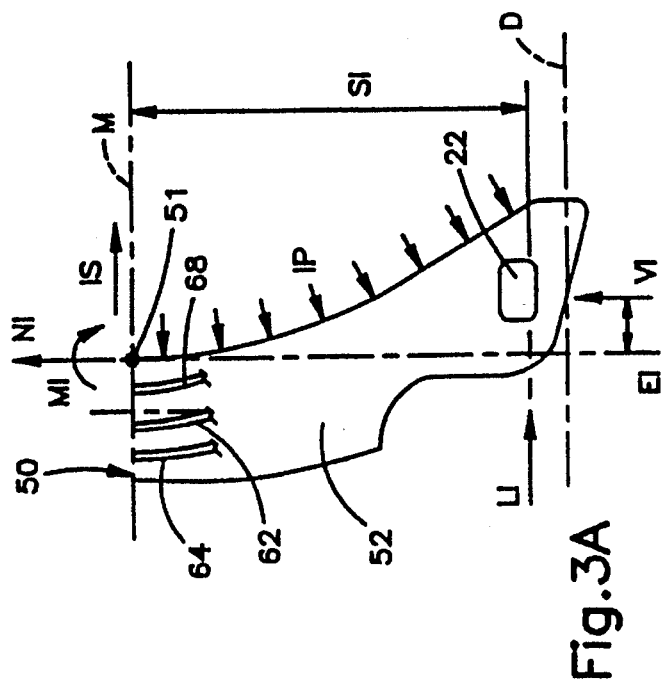
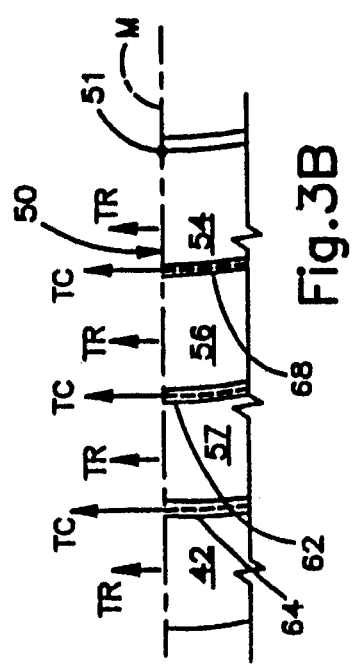
Fig.3A
Fig.3B

RUN-FLAT TIRE WITH THREE CRESCENT-SHAPED REINFORCING MEMBERS

BACKGROUND OF THE INVENTION

1. Field of the Invention

This application is a continuation-in-part of application Ser. No. 08/182,995 filed on 13 Jan. 1994 now U.S. Pat. No. 5,427,166. The invention relates to a radial, pneumatic tire and more specifically to an improved self-supporting or "run-flat" tire.

2. Description of the Prior Art

There is an ongoing effort by automobile manufacturers to eliminate the spare tire in order to reduce vehicle curb weight, increase available space within the vehicle and provide operator convenience. This is particularly true for vehicles having higher comfort specifications such as conventional luxury, family or urban-economy type vehicles.

One solution to increase trunk space and reduce weight of the spare tire is the mini-spare. This tinge has had extensive use and is a small tire mounted on a special rim. The tire has a slightly smaller diameter than the standard factory equipment tire. These tires are very limited in the number of travel miles permitted and the speed of the vehicle. They are intended to get the vehicle to a service station so the standard tire can be repaired. The mini-spare is not the best solution because the tire is not checked and loses air over time (by permeation) and will not have the performance characteristics of a standard size tire. Furthermore, space for the removed, full size flat tire is frequently not available.

Another recent solution is the run-flat tire. The possible advantages of this tire are to eliminate the need of a spare tire and ancillary equipment, to achieve substantial savings in vehicle weight and to increase the space for other automotive systems and cargo. These advantages are especially important with vehicles using ultra-low aspect ratio tires, but less important with vehicles using 60 and greater aspect ratio tires. Safety and convenience are another important factors in favor of using run-flat tires as follows:

1) It allows limited time for drivers to decide when or where along the road to change the tire.
2) It allows the driver to be in time for an important meeting as the run-flat tire may allow you to reach your destination.
3) It allows the driver the opportunity to change the tire at a more convenient time.
4) It enhances the handling of the vehicle with sudden or unexpected loss of inflation pressure.
5) It allows the driver the ability to avoid a hazardous roadside situation, for example, where a high-speed highway is crowded with little or no room available on the shoulder to make the tire change.

Numerous variations of run-flat tires have been developed. These involve changes to the structure of the tire itself and modifications to the rim to hold and support the flat tire. Each variation is limited by safety restrictions on vehicle speed, length of travel, zero inflation pressure handling and the magnitude of the lateral accelerations that force the bead of the tire off the rim seat. Further, the best solutions are those which do not affect the vehicle's nominal performance. The inflated ride comfort and handling should net be compromised by the design of the run-flat tire. Therefore, the need for improvements in the design of run-flat tires continues.

A number of generic features of run-flat tires have been disclosed which yield improvements, although limited, in vehicle performance. These features include thickened tire sidewalls, sidewall reinforcing plies, tire bead seat and vehicle rim configuration modifications, tire sidewall to rim flange contact and tire belt package edge modifications. Each of these features can be used to help improve run-flat performance. One important feature of run-flat tires is thickened sidewalls to support the vehicle after loss of inflation pressure. Such a sidewall, as the tire is viewed in cross-section, presents a crescent-shaped mass of rubber to the inside of the carcass reinforcing. On complete deflation of the tire, the crescent-shaped mass is put into compression while the carcass cord reinforcement is in tension; thereby preventing collapse of the sidewall. The respective inner wall surfaces of the tire do not contact one another and the rolling radius of the tire is maintained at a relatively large percentage of the inflated rolling radius of the tire. Six patents that disclose a thick sidewall design are U.S. Pat. Nos. 4,067,374; 4,779,658; 5,217,549; and 5,299,615, European Patent No. 456,437 (EP), and French Patent No. 2,469,297 (FR). Those patents having multiple crescent-shaped inner sidewall portions include U.S. Pat. No. 4,779,658 and FR 2,469,297.

U.S. Pat. No. 4,067,374 discloses the use of a crescent-shaped sidewall reinforcing rubber portion inside the carcass layer which has a high dynamic modulus with low hysteresis properties and high aging properties. The crescent-shape sidewall reinforcing rubber is put into compression while the cords of the carcass are put into tension, thereby inhibiting collapse of the sidewall. A cap ply located outside the belt package cooperates with the sidewall construction to increase the run-flat performance of the tire. The patent also discloses a lower sidewall support on the tire that contacts a rim flange when the tire is in an uninflated mode.

The crescent-shaped reinforcement rubber portion of the runflat tire in U.S. Pat. No. 4,779,658 has two layers; i.e., an anticrack layer adjacent to the carcass and a reinforcing layer inside the anticrack layer. The reinforcing layer provides more support for the tire when deflated and the anticrack layer is stated to provide a balance between ride comfort and crack resistance. This tire also has a protruding rubber bead toe portion supported by a rubber chafer and a fabric member made of textile cord.

The pair of crescent-shaped elastomeric reinforcing members disclosed in U.S. Pat. No. 5,217,549 are preferably for high profile tires having a section height of 5 inches (127 millimeters) or greater. Sidewall stiffness is achieved by a single high modulus crescent-shaped member in each sidewall with a reinforced bias ply strip on the inside or the outside surface of the two carcass plies. These bias ply strips are bias at 60 degrees and reinforcing members are of a nylon material.

In U.S. Pat. No. 5,299,615, the inner sidewalls of the tire have a crescent-shaped reinforcing rubber with a specified radius of curvature of the axially inner face in relation to the section height of the tire. Two radial carcass plies are turned up around the bead cores from the inside to the outside. Two cap plies are positioned radially outward of two belt plies. In addition, this run-flat tire design includes an extension of the bead area to form a bead toe for a bead retaining system.

British patent EP 456,437 has large crescent cross-sectional shaped sidewall members completely to the inside of the tire. These members are made to have an internal radius of curvature to be tapered at their inner and outer edges. The total thickness of each sidewall can be as high as 34 percent of the tire's section height. Both carcass layers and the inner liner run to the outside of the crescent members.

A two part crescent-shaped sidewall reinforcing ply of FR 2,469,297 has a relatively thick mass. The exterior portion adjacent the carcass plies is of a flexible cellular structure having a relatively low density and Shore A hardness. Preferably the neutral axis of the sidewall during bending is located in the interior portion of the reinforcing ply.

A critical and limiting feature of the run-flat tire is the ability of the deflated tire to stay on the rim during cornering maneuvers of the vehicle. This is known in the art as resistance to bead-unseating or bead retention. Bead unseating resistance is improved by extending or recessing the toe portion of the bead area to engage a rim having an extended or recessed portion. This feature of run-flat tires is noted in U.S. Pat. Nos. 4,554,960; 4,779,658; 4,917,164; and 5,299,615.

In U.S. Pat. No. 5,299,615, each bead area has a relatively thin rubber portion shaped axially inward of the carcass to form a bead toe. The toe extends radially inward to be inserted into a rim groove at the axially inner end of a tapered bead seat of a wheel rim. The base of the bead of the tire is further provided with a groove immediately axially outside the bead toe and inside a bead core. The groove fits into a hump formed in the bead seat of the rim for which the tire is designed.

U.S. Pat. No. 4,779,658 also shows a protruding rubber member which serves to reinforce the bead area to prevent the bead from unseating during run-flat travel. The protruding rubber seats the tire to a rim which is modified to receive the protruding rubber member.

The extended rubber toe portion of each bead area disclosed in U.S. Pat. No. 4,917,164 is a hard rubber member bonded to the crescent-shaped reinforcing layer. The toe portion has a preferred elastic modulus at 100 percent unit strain of 75 to 95 kilograms per square centimeter. A fabric reinforcing member or ply is attached to the exterior of the toe portion as an interface to the rim seat. Another rubber member is bonded to the heel portion at the rim interface. All these components help to maintain the tire on the rim after it becomes deflated.

The problem of maintaining the tire on the rim with a loss in inflation pressure is also discussed in U.S. Pat. No. 4,554,960. To resist bead-unseating, this patent discloses a specially designed bead area base and precise placing of the beads on the rim seats. A rim hump is formed on a standard rim with a circumferential hump having radially a cylindrical generatrix.

The bead-unseating problem is improved by the design of the bead core. In U.S. Pat. No. 5,263,526 the bead core has a polygonal cross-sectional area. No apparent disclosure of the torsional stiffness and moment of inertia values for this bead core are given for keeping the tire on the rim.

With the extensive flexing of the run-flat tire and the large deflections associated with the deflated rolling tire, the various components within the run-flat tire undergo gradual breakdown. High component temperatures and stresses also contribute to the breakdown of the materials in the run-flat tire.

Efforts to reinforce the crescent-shaped sidewall supporting members to give additional performance improvements are disclosed in U.S. Pat. Nos. 4,287,924; 5,238,040; and 5,368,082, Japanese Patent No. 3-14370 (JP), French Patent No. 2,458,407 (FR), and European Patent Application No. 385,192 (EP). Improvements include better heat conduction from the thickened sidewall portions, less heat generation in the sidewall, limited flexing or sagging of the deflated tire and reductions in the required thickness of the crescent-shaped reinforcement.

In U.S. Pat. No. 4,287,924 a two part crescent-shaped member has a heat conducting sheet or layer between the two parts. The layer extends over the whole height of the crescent-shaped portions and the two crescent-shaped parts are of different flexibility. The heat conducting layer may have parallel metallic cords extending radially to assist in the heat conductivity. The height of the tire is 31 percent of its inflated height when the inflation pressure is zero.

First and second elastomeric reinforcing inserts are interposed between first and second carcass plies being one at each different location in U.S. Pat. No. 5,238,040. A textile strip is also applied at a axially inner position to a third annular insert; being a large crescent-shaped insert extending from the belt edge to the bead. The textile strip runs from the crown area and terminates at the mid-height of the sidewall. The purpose of this design is to minimize the likelihood that carcass plies may work in compression.

In U.S. Pat. No. 5,368,082 the inner carcass layer divides the crescent member into two elastomeric fillers. The inner filler is thicker than the outer filler. The outer carcass ply turns up around the bead core to a mid-height of the tire A thick outer sidewall rubber portion in the shoulder area is also used.

The cord reinforcing unit on the interior surface of the sidewall crescent-shaped reinforcing member in JP 3-143710 consists of at least one reinforced ply. The crescent member and the reinforced ply provides the overall sidewall support for run-flat performance. Also, the bead area has a rubber toe portion that fits into a rim recess for bead seat retention.

A portion of the crescent-shaped reinforcing member in FR 2,458,407 is positioned inside the innerliner rubber (FIG. 3). This interior portion has some load bearing abilities, but also becomes an interior sealant material. The total thickness of the sidewall portion at an median plane of the tire is expressed as a function of the load on the tire, the section width of the tire and the radial distance from the axis of rotation to the median plane.

In EP 385,192 a textile reinforcement insert is positioned in the crown area of the tire and extends radially inward to divide a crescent-shaped member. The insert stops at a distance radially outward of the bead core beyond the apex of the bead filler. The insert lies along the center axis of the crescent-shaped member. The crescent-shaped member also terminates at the radial outermost extent of the bead filler in this patent.

Physical properties of the sidewall reinforcing members are important in the durability of the run-flat tire. Modulus of elasticity relationships are given for sidewall members in U.S. Pat. No. 5,295,526. The complex modulus E* values are used along with the JIS-A hardness values of the bead filler to give improved performance. The bead filler is further reinforced in this patent by extending carcass layers to be turned-up around the bead core.

A further reference is U.S. Pat. No. 5,427,166. This patent is by the same inventor and is assigned to the same owner as the present application. That is, the applicant is the same. U.S. Pat. No. 5,427,166 has three carcass layers which are positioned around two crescent-shaped reinforcing members in the sidewall. The present continuation-in-part invention has many additional improvements over this reference; to be shown in further sections of this application.

The features discussed above can be used in the design of a run-flat tire having some run-flat endurance capability.

However, even combining all of such features will provide a run-flat tire with only limited performance capabilities. There remains a need to have improved tire performance to permit additional travel distances and especially to achieve improved load supporting capabilities for the vehicles using higher aspect ratio tires. Problems continue to inhibit run-flat tire performance when vehicle ride comfort of the inflated tire is considered. The need is to add features to create a run-flat tire which has little or no influence on the vehicle during inflated tire running but which have a significant influence after loss of tire inflation pressure, particularly in improvements to the load supporting and cornering comfort capabilities of the vehicle.

The references indicate that there are five essential areas of the tire and rim of concern for designing a good run-flat tire. These can be summarized as follows:

1. Sidewall rubber reinforcing members for supporting the tire for an adequate distance when deflated that do not influence inflated ride comfort and handling.
2. The summit area at the lateral edges to maintain inflated performance and deflated belt edge durability.
3. The bead area to prevent the unseating of the tire from the rim after loss of inflation pressure and to maintain inflated performance, comfort and pressure to keep the tire seated on the rim.
4. The rim seat to help retain the deflated tire remain in its same position on the rim.
5. A monitoring system to be able to have the tire fixed before it is destroyed.

The addition of sidewall components, such as harder rubber bead fillers and reinforcing plies have been disclosed in standard tire and rim association (T&RA) tires to improve handling. However, these components in a tire degrade the ride comfort or other performance characteristics of the inflated tire.

There is a need for a new run-flat tire having improved performance characteristics that overcome some of the limitations discussed in the art. A run-flat tire should permit the continuation of almost normal operation of the vehicle. This is a particular need for a luxury car, family or urban-economy vehicle and the like. A durable run-flat tire is also needed that has an acceptable response to steering inputs at zero inflation pressure yet capable of adequate inflated ride comfort with a relatively soft vehicle suspension system. Furthermore, vehicles of all types can have available space problems as a result of their overall dimensions, and the desire to have relatively large passenger and luggage spaces combined with the variety of automotive systems of a modern vehicle.

SUMMARY OF THE INVENTION

Space, weight and convenience problems associated with spare tires are solved by a run-flat tire. An object of this invention is to provide a run-flat tire which demonstrates improved vehicle performance under deflated conditions and yet achieves the same vehicle performance as a standard tire when inflated.

A further object of this invention is to provide a run-flat tire which can be constructed by conventional manufacturing techniques, requiring few additional manufacturing steps and procedures, thereby having a cost effective tire which will achieve the required long travel distances at relatively high speeds and with minimum changes in vehicular ride comfort and/or steering feel.

A still further object is to prevent premature and sudden stress cracking from being produced during run-flat travel in or near the boundaries between the crescent-shaped reinforcing members and the reinforced carcass layers in the load bearing sidewall portions of the run-flat tire.

In particular, the run-flat tire of this invention introduces an essential third crescent-shaped reinforcing member that extends from a belt package radially inward to a bead filler. A middle carcass layer of the three carcass layers bisects the second and third crescent-shaped reinforcing members. Other bead portion and belt package features and components are disclosed that are a part of the total combination that yields improved run-flat tire performance. This run-flat tire improves deflated tire running and maintains ride comfort and handling during inflated tire running. This higher profile run-flat tire is particularly useful on luxury, family and urban-economy type cars. Tires for these vehicles have aspect ratios in the range of 40 to 65 percent. Aspect ratio is defined as the tire section height as a percent of the overall tire width.

The preferred embodiment tire of this invention is easily mounted on a standard rim of a vehicle and is capable of sustaining vehicle loads at the tire's contact patch with the loss of inflation pressure. The tire has a crown portion with a tread. A belt package is located radially inward of the tread. An innerliner portion covers the interior surface of the tire. There are a pair of bead portions each having a bead core and a bead filler. A pair of load bearing sidewall portions are each disposed radially between a respective lateral edge of a crown portion of the tire and a respective bead portion. Each sidewall portion having first and second crescent-shaped reinforcing members disposed outside the innerliner portion and a third crescent-shaped reinforcing member extends radially outward from and centiguous integral with the bead filler. The sidewall portions each have a sidewall rubber portion at the outer surface of the tire. An outer carcass layer is disposed radially inward of the belt package and axially inward of the sidewall rubber portion. The outer carcass layer extends radially inward to at least a point axially exterior and adjacent to each bead core. A middle carcass layer is disposed to the inside of the outer carcass layer and extends under the crown portion then radially inward between the second member and the third member of the crescent-shaped reinforcing members in each sidewall to each bead portion and continues around the bead core with turned-up portions from inside to outside in such a manner to at least partially encompass the bead core and a respective bead filler. An inner carcass layer is disposed inside of the middle carcass layer and extends under the crown portion then radially inward between the first member and the second member of the crescent-shaped members in each sidewall portion. The inner carcass layer extends radially inward to at least a point axially interior and adjacent to each bead core. The carcass layers each have a plurality of substantially parallel reinforcing members and a curvilinear configuration.

In a generic embodiment of the invention at least a pair of crescent shaped reinforcing members can be separated by any interface portion that achieves the objects of this invention by its position within the sidewall portions. The position of the interface portion (i.e. inner carcass layer) between at least two crescent-shaped reinforcing members provides a radial stepwise stress distribution between the two crescent-shaped reinforcing members axially across the interface portion on a median plane adjacent a central radial plane of a contact patch. The position of the interface portion also reduces the maximum deflection of the deflated tire due to vehicle loads. Three total carcass layers, with the middle and inner carcass layers providing the interface portions, are preferred to provide extra reinforcement for the severe operating conditions during abnormal deflated running, such as curb impact, high temperatures or extreme deformations.

In a further embodiment of this invention a belt package is located radially outward from a crown portion of the outer carcass layer. In this embodiment, a first belt of the belt package is located radially outward of the crown portion of the carcass layers. At least one other belt is located radially outward of the first belt. The first belt is wider than the other belts. A cap ply is located outward of the other belts and inward of a tread portion. The cap ply is wider than both the first and other belts. The tread portion is located radially outward of the belt package for contacting a ground surface.

In a further embodiment of this invention, a rim seat ply contacts the rim at each tire/rim interface and has a square woven fabric as reinforcing members. A rubber seat portion is positioned to support the rim seat ply at each bead portion. A second rubber toe portion is located axially and radially inward of the bead core. The toe portion also supports the rim seat ply and helps keep the tire on the rim at a tire/rim interface. Finally, a pair of rubber support portions are disposed to assist the rim seat ply in contacting a flange of the rim at the tire/rim interface when the tire is deflated.

Another embodiment includes a tire and rim system capable of sustaining vehicle loads effectively with the loss of inflation pressure. The tire and rim system includes the preferred run-flat tire including the rim seat ply, the first rubber seat portion and the second rubber toe portion which is mounted on a rim having a hump disposed at the axial innermost end of the rim seat ply of the tire. The rim seat ply may engage the rim hump so that the tire remains seated on the rim during vehicle maneuvers as well as during straight ahead running.

BRIEF DESCRIPTION OF THE DRAWINGS

The foregoing and other objects and features of the present invention will be more clearly understood and apparent to those skilled in the art to which the present invention relates from reading the following description and specifications thereof and when incorporated with the accompanying drawings in which:

FIG. 3A is an elevation view of a radial section of one of the lower sidewall and bead portions of the run-flat tire below a median plane for a mounted, loaded and inflated tire;

FIG. 3B is an enlarged view of the upper extent of the tire portions shown in FIG. 3A and schematically showing the approximate radial load distribution on the median plane of the tire;

FIG. 5A is an elevation view of a radial section of one of the lower sidewall and bead portions of the run-flat tire below a median plane for a mounted and loaded tire running deflated;

FIG. 5B is an enlarged view of the upper extent of the tire portions shown in FIG. 5A and schematically showing the radial load distribution on the median plane of the tire.

DETAILED DESCRIPTION OF THE INVENTION AND ITS PREFERRED EMBODIMENTS

The unique features of the run-flat tire of this invention, which yield the improvements needed for a vehicle to overcome the above described limitations of state-of-the-art tires, include the load bearing sidewall portions each having first, second, and third crescent-shaped reinforcing members bisected by essential middle and inner carcass layers. Each of the essential three reinforced carcass layers extend from the bead to at least a crown point inside the belt package, and preferably extend the full width and depth of the tire from bead to bead. The bias of the carcass reinforcing members from a radial plane is determined by the vehicle application. The run-flat tire is a radial tire having carcass reinforcing bias angles from about 75 degrees to 90 degrees. Other structural features in combination with the unique sidewall portions include a belt package with at least two belt plies and a cap ply as well as a pair of bead portions each including a relatively high modulus bead core, a rubber support portion, a rubber seat portion, a rubber toe portion and a rim seat ply at the tire/rim interface that may engage a hump on a rim of the vehicle. A bead filler radially outward of the bead core is made to interface the third crescent-shaped reinforcing member at its outermost radial extent.

Figure 2:
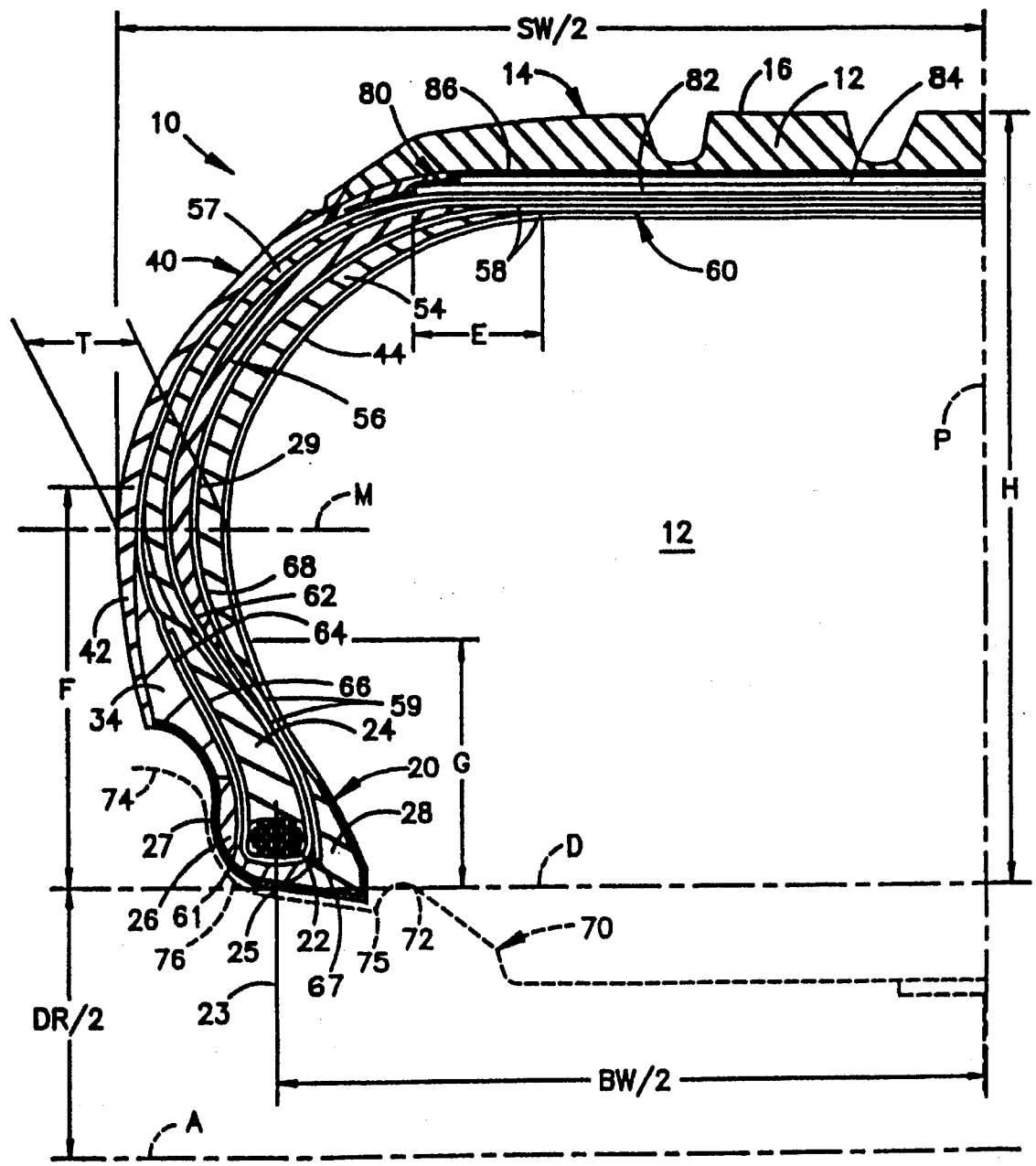
FIG. 2 is a partial cross-sectional view of the mounted and inflated run-flat tire according to the invention taken along a radial plane passing through the axis of rotation.

The run-flat tire 10 of this invention has a cross-sectional configuration in a radial plane containing an axis of rotation A of the tire as illustrated in FIG. 2. This figure shows half the cross-section which is symmetrical about the midcircumferential plane P. The tire having this cross-sectional configuration is readily mounted on a rim of a vehicle.

Figure 1:
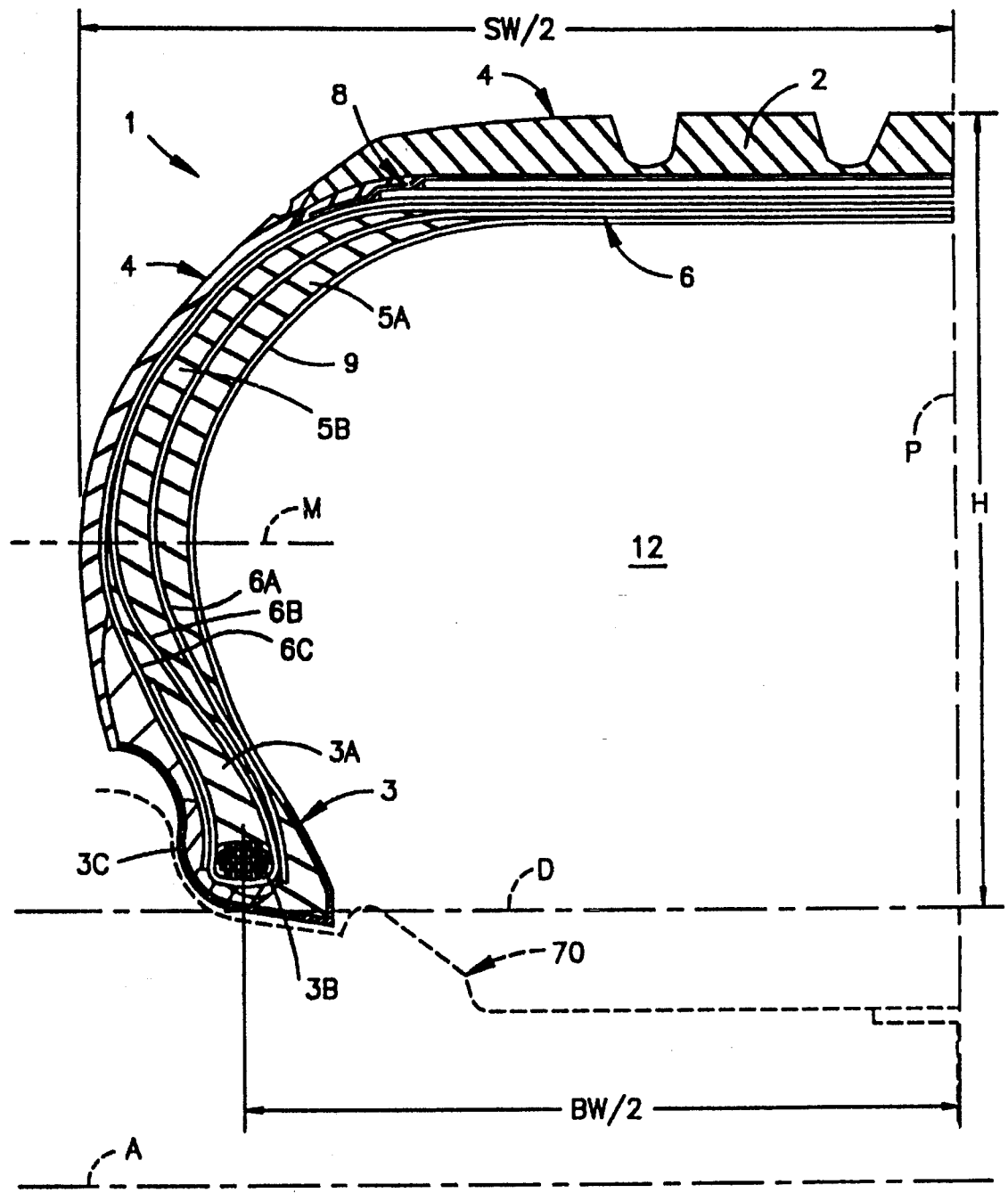
FIG. 1 is a partial cross-sectional view of a comparative run-flat tire inflated and mounted on a rim.

The basic tire design of this invention is that disclosed in U.S. patent application Ser. No. 08/182,995 now U.S. Pat. No. 5,427,166 as illustrated in FIG. 1. This application is a CIP of this parent application. The sidewall 4 of this tire 1 has a pair of crescent-shaped reinforcing members 5A and 5B that extend from the edge of the belt package 8 to the bead area 3. Three carcass layers 6A, 6B and 6C of the carcass 6 extend from one bead area 3 to the opposite bead area. The inner carcass layer 6A divides the first crescent-shaped member 5A from the second crescent-shaped member 5B. The sidewall 4 is outside the middle and outer carcass layers 6B,6C and an innerliner ply 9 is interior to the first crescent-shaped reinforcing member 5A. The crescent-shaped members extend radially outward and axially inward to lap over the lateral edge of the belt package 8. The bead reference D establishes the radial extent of the bead filler 3A and the middle carcass layer turn up with regard to the section height H of the tire 1. A bead seat rubber 3C and a rubber toe portion 3B help hold the tire on the rim 70.

The basic difference between the comparative tire of FIG. 1 and the tire of this invention, as illustrated in FIG. 2, is the addition of a third crescent-shaped reinforcing member. The tire of this invention also has a pair of bead portions 20 axially spaced apart and each include a bead core 22, a rubber support portion 34, a first rubber seat portion 26, a second rubber toe portion 28 and a rim seat ply 27. A carcass 60 has a middle carcass layer 62, an outer carcass layer 64 and an inner carcass layer 68. The middle carcass layer 62 has a turned-up portion 66 which extends around the bead core 22 from inside to outside of the tire 10 to a distance G radially outside the bead reference D, as illustrated in FIG. 2. The distance G is in a range of 25 to 50 percent, and preferably equal to about 40 percent, of the section height H. The bead reference D is established by a line parallel to the axis of rotation A from the intersection of a radial line 23 from the center of the bead core 22 and the innermost surface of the rim seat ply 27 at point 25. The inner carcass layer 68 is positioned uniformly between the middle carcass layer 62 and the innerliner portion 44 in each bead portion 20 and extends radially inward to at least a point 67 axially inward and adjacent to the bead core 22. The outer carcass layer 64 of the tire is located axially outside the middle carcass layer 68 and the turned-up portion 66 and extends radially inward to at least a point 61 axially outward and adjacent to the bead core 22. The bead filler 24 contacts the outermost surface of the bead core 22 and extends a distance F radially outward of the bead reference D. The bead filler 24 is contoured to be contiguous with the third crescent-shaped reinforcing member. The bead filler and the third crescent-shaped member can be one unitary homogeneous material to act as both components. The bead filler 24 extends a distance F in a range of 45 to 60 percent, and preferably about 55 percent, of the section height H.

Figure 4:
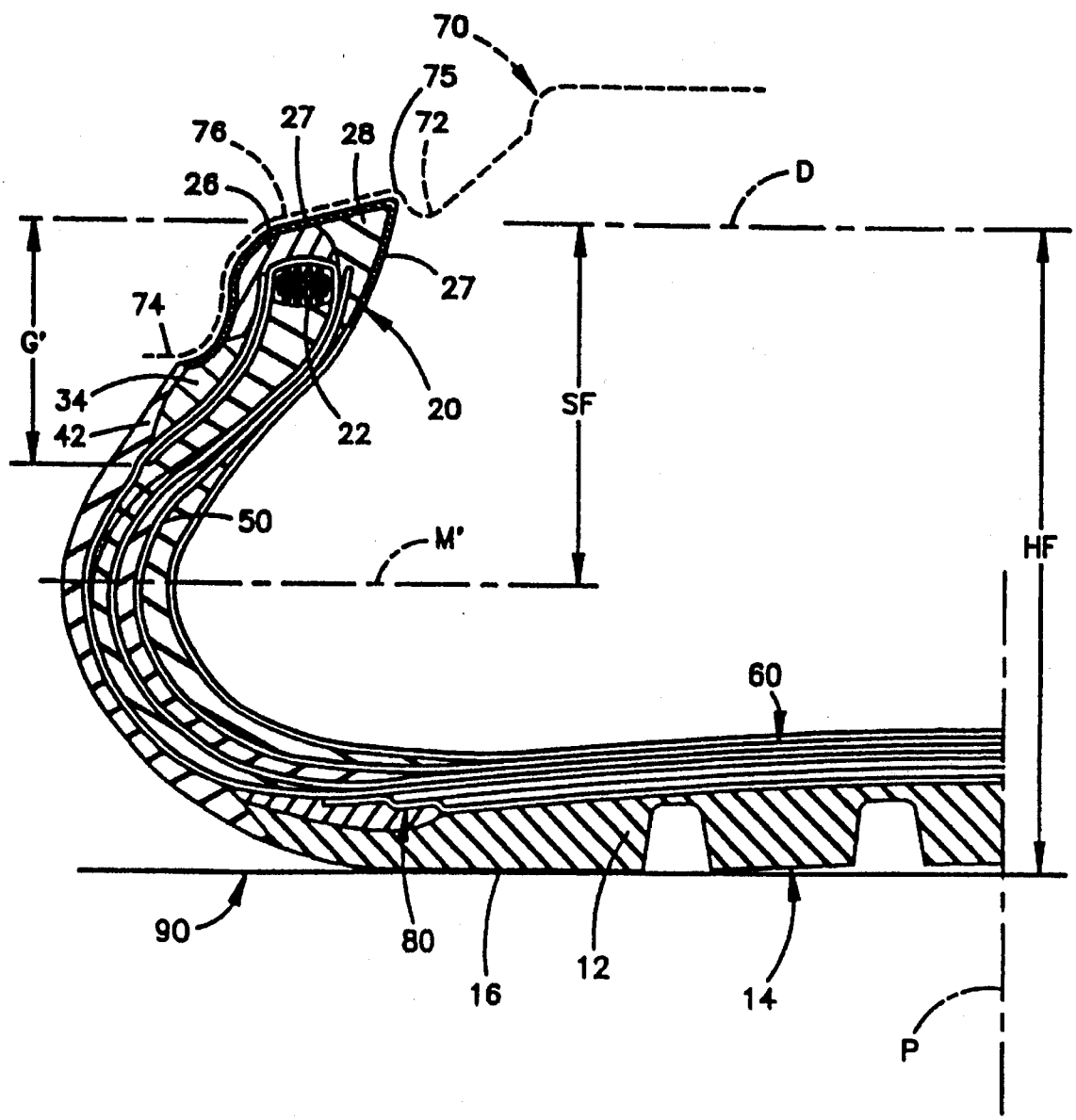
FIG. 4 is a partial cross-sectional view of the mounted, and loaded run-flat tire in contact with a ground surface and running flat according to the invention.

A load bearing sidewall portion 40 extends from a belt package 80 of the tire to the bead portion 20 at both axial edges of a crown portion 14. Each sidewall portion 40 includes three crescent-shaped rubber reinforcing members 54, 56, and 57 as shown in FIGS. 2 and 4. The profile shape of the crescent-shaped reinforcing members may also be lenticular within the scope of this invention. The first crescent-shaped reinforcing member 54 is disposed between the inner carcass layer 68 and the innerliner portion 44. The second crescent-shaped reinforcing member 56 is disposed between the middle carcass layer 62 and an inner carcass layer 68 of the tire 10. The third crescent-shaped reinforcing member 57 is disposed between the outer carcass layer 64 and the middle carcass layer 62, and is radially outward of the bead filler 24. The sidewall portions 40 help maintain the crown portion 14 radially separated from the bead portion 20 when the tire has a loss of inflation pressure. A tread rubber portion 12 has a surface 16 for contacting a ground surface 90 during running of the tire.

The rubber in the tread rubber portion 12 and a sidewall rubber portion 42 may be of any suitable compound based on natural or synthetic rubber or any suitable combination thereof known in the art. The innerliner portion 44 is preferably of a halobutyl rubber.

The overall profile of the sidewall portions 40 are shaped in a manner to provide the best equilibrium curve for generating normal and lateral forces on the tire during inflated running. A thickness of the load bearing sidewall portion including a sidewall rubber 42, the inner, middle and outer carcass layers 68, 62, 64, the first, second, and third crescent-shaped reinforcing members 54, 56 and 57 including the bead filler portion 24 and the innerliner portion 44 is approximately constant over its radial extent. The sidewall portion 40 has a width of about 7 percent to about 11 percent of a section width SW of the tire 10. The crescent-shaped members 54, 56, and 57 have a profile geometry including a thickness distribution to produce optimum inflated and deflated tire performance. The first and second crescent-shaped members extend to a crown point 58 in the crown area of the tire axially inward of the total extent of the belt package 80 a distance E of at least 20 millimeters. A preferred thickness distribution of the crescent-shaped members is that the first crescent-shaped member 54 has a thickness substantially equal to that of both the second and third crescent-shaped members 56 and 57. The properties of these crescent-shaped members are discussed later.

The belt package 80 is located radially outward of the carcass layers 62, 64 and 68 in the crown portion 14 of the tire 10. In an embodiment of this invention, the belt package has a wide inner belt 82 and at least one narrower outer belt 84 (FIGS. 2 and 3). A cap ply 86, having a width to axially extend beyond both lateral edges of the innermost belt 82, is included as part of the preferred belt package 80. These belt components allow the lateral areas of the crown portion 14 to be more compliant in compression, which improves the endurance of the tire when running deflated. This results in a redistribution of the load so that the tread portion 12 at its two shoulder regions can fully support the loads from the sidewall portions 40. Reinforcing members of the inner belt 82 are preferably of a metallic (i.e. steel) material. Reinforcing members are substantially parallel in each belt 82 and 84 and can be made of an aromatic polyamide or a metallic (i.e. steel) material. Reinforcing members of the outer belt 84 are also preferably of a metallic material. Belt reinforcing members are at an acute angle (16 to 30 degrees) with respect to the midcircumferential plane P of the tire. The cap ply 86 has reinforcing members preferably of a polyamide multi-filament (i.e., nylon) material which are approximately parallel to the midcircumferential plane. Other belt package and cap ply materials that maintain structural integrity of the tire may be used for the reinforcing members within the scope of this invention.

The overall section height H is measured from the bead reference D (FIG. 2). The overall section width SW is measured in the maximum width median plane M. The ratio of the section height H to the overall section width SW is the aspect ratio of the tire. Aspect ratios between approximately 0.40 to 0.65 are preferred values for the cured run-flat tire of this invention.

The run-flat tire 10 is mounted on a rim 70 as illustrated in FIG. 2. The rim 70 can be a standard T&RA rim but preferably has a hump 72 added to help retain the bead portion 20 of the tire on the rim 70. The nominal rim diameter DR is measured to a rim reference D which is associated with the size of the tire. The reinforced rim seat ply 27 contacts the rim at the tire/rim interface 76. The contour of the rubber seat 26 has been designed to obtain a more uniform pressure distribution at the tire/rim interface 76. The increase of frictional forces between the tire rim seat ply 27 and the rim 70 at the tire/rim interface 76 helps maintain the tire 10 seated on the rim 70. The rim seat ply 27 also contacts the hump 72 near a base point 75. The design of rubber seat and toe portions is disclosed in U.S. Pat. No. 4,554,960, which is incorporated herein by reference thereto. The rim seat ply 27 has essentially square woven fabric reinforcing members at ±45 degrees with the radial plane and extends circumferentially around tire at each bead portion 20. Any square woven fabric standard in the industry for tire reinforcing can be used. The woven fabric reinforcing members are preferably of a textile material (i.e. aromatic polyamide, polyester, rayon or nylon).

The symmetric hump 72 on the rim 70 is referred to as a "SH contour" rim. The diameter to the outermost surface of the hump 72 is at least at the same radial extent as the bead reference D. This profile provides additional axial support to keep the bead portions 20 from being unseated. The run-flat tire 10 of this invention, as well as any other standard T&RA tire, is easy to mount and dismount on this SH contoured rim 70.

A gap between a flange 74 of the rim 70 and the tire 10, as observed in FIG. 2, is provided to prevent contact between the inflated tire 10 and the rim 70 during inflated running. Contact between the inflated tire and the rim in this region when the vehicle is cornering will affect the handling characteristics of the vehicle. The gap is maintained between the rim seat ply 27 with its rubber support portion 34 and the flange 74 of the rim 70 during inflated running conditions. A sidewall rubber 42 is preferably positioned to the exterior of the each rubber support portion 34 and is spaced from the flange 74 by the same gap.

A loaded and deflated run-flat tire 10 in contact with a ground surface 90 is illustrated in FIG. 4. The crown portion 14 of the tire 10 has a tread 12 with a tread design or sculpture wherein surface areas 16 make contact with the ground surface 90. The radial section height H of the inflated free tire 10 (FIG. 2) is compressed to a deflated run-flat height HF, with both heights being measured from a bead reference D. The crescent-shaped portions are under compression and bending and the rim seat ply 27, backed-up by the rubber support portion 34, and the sidewall rubber are in contact with the flange 74 of the rim 70. In addition, the distance from the center of the bead core 22 to a base point 75 (FIG. 2) on the hump 72 of the rim is in a range of 12 to 16 millimeters. The carcass turn-up portions 66 of the middle carcass layer 62 now extend outward from the bead reference D a distance G (FIG. 2) in the range of 25 to 40 percent of the deflated section height SH of the tire. This configuration helps transmit the radial loads from the surface areas 16 to the rim 70 of the vehicle.

The physical properties and shape of the various portions of the tire 10 are important to increase both the lateral and radial stiffness of the deflated tire 10. For example, the rubber seat portion 26 and the rubber toe portion 28 are contoured to provide a continuous footing of the rim seat ply 27 on rim 70 at the tire/rim interface 76 (FIG. 4) for the reasons discussed above.

Preferably the tire 10 is optimized so that the forces and moments schematically shown in FIG. 3A operate to ensure equilibrium of the lower sidewall and bead portions of the mounted and inflated tire. A sufficiently small finite circumferential length of one of the lower sidewall and bead portions is considered in this analysis such that force changes on adjacent radial planar surfaces 52 have a limited influence relative to the moment and forces shown in FIG. 3A and, therefore, are not illustrated. The internal inflation pressure IP produces a relatively large axial force LI at the bead to rim interface. The section face 50 at the median plane M has a resulting normal tension force NI to help resist the internal pressure IP. The tension force NI resultant comprises membrane tension forces TC in the three carcass layers as well as tension forces TR in the rubber components, as illustrated in FIG. 3B. The relative magnitude of these tension forces are shown to be approximately equal but can vary from one component to another within the scope of this invention. The moment MI from the forces on surface 50 at the median plane M about a moment axis perpendicular to the radial plane surface 52 at inner point 51 is clockwise, as shown in FIG. 3A. This is a result of the tension forces TC and TR. The resulting radial force VI at the tire/rim interface 76 is sufficient to maintain the inflated tire in substantially air tight contact with the rim, whereby the inflation pressure IP in the cavity 12 of the tire 10 does not diminish. The response to the inflation pressure IP pushing the tire 10 away from the rim 70 the tension in the bead core 22 holds the tire on the rim as a result of the cured tire's diameter being smaller than the diameter DR of the relatively rigid rim 70. This vertical force VI will increase in the region of the external load (tire's contact patch) for the rolling tire on the vehicle. This increased vertical force VI is insufficient to produce a resulting compression force (−NI) on the median plane surface 50 with a nominal inflation pressure IP.

With the total loss of inflation pressure (i.e. IP=0) the force distribution on the lower sidewall and bead segment changes dramatically, as illustrated in FIG. 5A. The membrane tension is lost and the resultant radial force on the small circumferential length of tire at the tire/rim interface 76 increases from a value for the inflated tire's radial force VI, to a value VF associated with essentially half of a symmetrical load supported by the tire. The axial force (LF) is reduced from the fully inflated tire axial load (LI) as there is no longer a need to react any axial component of the inflation pressure inside the tire.

The section face 50 at the median plane M' moves axially outward and radially inward as the tire deforms to a section height HF (FIG. 4). The eccentricity EF of the resultant radial force VF at the rim is the axial distance to the inner point 51 on the section face 50. This distance is larger than an eccentricity EI for the mounted and inflated tire of FIG. 3A. The efficiency or effectiveness of the run-flat tire at zero inflation pressure can be quantified by the magnitude of the change in eccentricity from EI to EF. That is, the smaller the change in eccentricity (EF−EI) the more effective the run-flat tire design. Another measure of run-flat tire efficiency is its load vs. deflection capability. The more efficient run-flat tire will support a larger radial force VF at the same change in eccentricity EF−EI. The run-flat tire of this invention is designed to be relatively efficient. Forces LF, VF, and the toe force LT are reacted at the section face 50 at the median plane M'. The toe force LT helps hold the bead area 20 in contact with the rim 70 at base point 75 and will be discussed in more detail later in this disclosure. The greater the radial force VF and its eccentricity EF plus the axial force LF and its radial moment arm SF (VF×EF+LR×SF) the greater the moment MF around the moment axis at the inner point 51 on the section face 50 of the median plane M'. The greater the tow force LT, the smaller the moment MF which shows the importance of the rim hump 72. The loads on the section face 50 produce a resulting force NF and a moment MF to resist the loads and the moments caused by loads at the tire/rim interface 76, as well as inertial forces by the rotating tire.

The distribution of loads on the section face 50 of the median plane M', as illustrated in FIG. 5B, are essential in support of the vehicle by the deflated tire 10 of FIG. 4. The sidewall crescent-shaped reinforcing members 54,56, and 57 are used in the tire to basically support the vehicle loads by compressive forces. In accordance with the present invention, the run-flat tire has two additional carcass layers 62,68 positioned to assist the crescent-shaped members 54,56, and 57 in support of these compressive loads. The resultant compressive force C1 acting on the first crescent-shaped member 54 and the resultant compressive force C3 acting on the second crescent-shaped member 56 and the resultant compressive force C5 acting on the third crescent-shaped reinforcing member 57 are schematically illustrated in FIG. 5B. Although the schematic representations of the compressive forces C1, C3, and C5 are not intended to represent any particular absolute values of the forces, the schematic representations are provided to illustrate the relatively greater value or magnitude of the compressive force C1 on the first crescent-shaped member 54 as compared to the compressive force C3 on the second crescent-shaped member 56 and further as compared to the compressive force C5 on the third crescent-shaped reinforcing member 57. The addition of the reinforced carcass layers has numerous advantages as follows:

(1) the compressive forces C1, C3 and C5 of the first, second and third crescent shaped members 54, 56 and 57 respectively can be reduced by the compressive forces C2 and C4 on the inner and middle carcass layers 68 and 62 respectively;

(2) a stepwise reduction in the compressive stress distribution 53 from the compressive force C3 is made possible by the compressive load C2 on the inner carcass layer 68 and a stepwise reduction in the distribution from force C3 to the distribution from force C5 is made possible by force C4 in the middle carcass layer 62;

(3) the magnitude of radial shear forces at the interfaces between the crescent-shaped members 54, 56, and 57 and carcass layers 62, 64 and 68 are reduced to provide improved endurance of the run-flat tire of this invention; and (4) it restrains the counter deflection magnitude and, therefore, the deradialization of all carcass reinforcing members at the leading and trailing edges of a contact patch being the area where the tire 10 contacts the ground surface 90.

The compressive stress distribution 53 can vary from the linear distribution illustrated in FIG. 5B, but a stepwise reduction toward the exterior of the tire will continue to exist in the tire of this invention when going from one crescent-shaped reinforcing member to the adjacent one.

The position of the inner carcass layer 68 from the moment axis at inner point 51 in FIG. 5B is defined by the distance DC. This distance can be selected to provide the proper advantages or improvements in the run-flat tire's ability to support itself. The axial distance DC to the inner carcass layer 68 from the moment axis at inner point 51 on the median plane M' can be optimized. Other planes through the tire sidewall portion can also be selected and the axial position of the inner carcass layer determined. The selection of the distance DC at the median plane M' is optimized based on the following (see FIG. 5B):

1) the carcass cords 69 of the inner carcass layer 68 are able to develop their full compression capability;

2) the absolute sum of tension forces T1+T2 and compression forces C1+C2+C3+C4+C5 are equal to the total compression force NF on the cross-section 50; and 3) the sum of the counterclockwise moments from compression forces C1–C5 and the clockwise moments from the tensile forces T1–T2 must equal the resisting moment MF which is clockwise and approximately equal in magnitude to the moment from forces at the tire/rim interface.

An increase in the axial distance DC adversely affects the resisting moment MF, and a decrease in the axial distance DC to near zero (inner carcass layer near the innerliner) can cause the carcass reinforcing members 69 to be subjected to buckling due to increased compression forces exerted on these members. The axial distance DC for durable run-flat tires 10 result in a preferred location such that approximately equal thicknesses of the first crescent-shaped reinforcing member 54, the second crescent-shaped reinforcing member 56, and the third crescent-shaped reinforcing member 57 at the median plane M'.

The three crescent-shaped reinforcing members 54,56, and 57 can be formed of a substantially identical material to enhance the ease of manufacture in the tire building operation. The run-flat tire can thus be constructed with only a limited number of additional products and manufacturing procedures. By providing end positions 58,59 of the first and second crescent-shaped reinforcing members which are displaced axially and radially from one another, the performance of the run-flat tire can be further adjusted for vehicle suspension variations. The preferred tire has end positions 58,59 of the first and second crescent-shaped members adjacent to one another as shown in FIG. 2. The radially outward end position 58 is located axially inward of the lateral end of the belt package 80 a distance E. The preferred distance E is approximately 20 millimeters. The third crescent-shaped reinforcing member 57 is a continuation of the bead filler 24 that starts at the bead core 22. The third crescent-shaped member extends radially outward to an end location adjacent the lateral end of the belt package 80. The result is a cost-effective run-flat tire for luxury, family and urban-economy type vehicles.

The crescent-shaped reinforcing members 54,56, and 57 can have the same material property or three different material properties. Harder rubber first and second crescent-shaped members 54 and 56 can support the same load on a reduced cross-sectional area and thereby effectively decreases the total mass of the tire required to support the load of the vehicle. The following physical properties of the crescent-shaped reinforcing members 54,56, and 57 insure a stepwise reduction in the stress distribution and help failures to be more progressive (onset of failures) when the tire is running deflated.

The third crescent-shaped member 57 is a contiguous with, the bead filler 24 and both are located axially outward of the middle carcass layer 62. They have a Shore A hardness in the range of approximately 70 to 90 and preferably 75 to 80. The third crescent-shaped member 57 along with the bead filler 24 have a modulus of elasticity in compression at a ten percent unit strain in a range of approximately 7.0 to 15.0 megaPascals (MPa) and preferable equal to about 8.5 MPa. The bead filler 24 can be a separate component with a harder rubber having a Shore A hardness in the range of approximately 85 to 95 and a modulus of elasticity in compression at ten percent unit strain in a range of approximately 10 MPa to 60 MPa.

First and second crescent-shaped members 54 and 56 are innermost to the middle carcass layer 62 and the first crescent-shaped member is in contact with the outside face of the innerliner portion 44. The first and second crescent-shaped members 54 and 56 also have a Shore A hardness in the range of approximately 70 to 90 and a modulus of elasticity in compression at a ten percent unit strain in a range of approximately 7.0 to 15.0 MPa. The preferred Shore A hardness of the first and second crescent shaped members 54,56 is approximately 75 to 80 and their preferred modulus of elasticity is about 8.5 MPa. The first, second, and third crescent-shaped reinforcing members exhibit a relatively low hysteresis. Based on actual performance results the preferred embodiment of this invention is with the crescent-shaped reinforcing members 54,56, and 57, along with the bead filler 24, having essentially the same material physical properties.

The presence of the carcass layers between the crescent-shaped members provides a stepwise stress distribution 55 (FIG. 5B) between these crescent-shaped members as discussed above. The carcass layers provide the necessary stress reduction between crescent-shaped reinforcing members without the cost of having two or three different material properties for the crescent-shaped shaped reinforcing members. A lower modulus of elasticity for the axially outer third crescent-shaped reinforcing member 57 of this invention is not preferred as it further reduces the ability of this crescent-shaped member 57 to resist compressive loads and at the same time have a reduced mass. The crescent-shaped reinforcing member 57 also works with the bead filler 24, which usually has a relatively high modulus of elasticity.

The thickness of the crescent-shaped reinforcing members can be varied to provide improved performance of the run-flat tire. The maximum thickness of each crescent-shaped reinforcing member will occur near the median plane M and can be measured in a cross-section cut of the tire as illustrated in FIG. 2. The maximum thickness of each one of the first, second and third crescent-shaped reinforcing members is in a range of values of about 3 millimeters to about 6 millimeters. Test results show how the performance varies with different thickness values for the first crescent-shaped reinforcing member relative to the second and third crescent-shaped reinforcing members.

During run-flat rolling of the deflated tire 10, the length of the contact patch or footprint of the tire on the ground surface 90 is increased. This length can range from 2 to 5 times the footprint length of the inflated tire. In the process of the tire being deflated, there is a transfer of the essential normal load supporting portions of the tire from tension in the inner and middle carcass layers 62,64 to compression in the carcass layer 68 as well as compression in the crescent-shaped reinforcing members 54,56 of the tire 10. The reinforcing members 65,63, and 69 of the outer, middle, and inner carcass layers 64,62, and 68 respectively are cords made of any suitable material from the group consisting of rayon, nylon, aromatic polyamide and polyethylene napthalate. The large deformations of the run-flat tire 10 are illustrated in FIG. 4 by the tire section height HF for the loaded and deflated tire and the section height H for the unloaded and deflated tire of FIG. 2. Another result of this large deformation is that the section height HF of the deflated and loaded run-flat tire is approximately 40 to 60 percent of the cured tire section height H, for the preferred embodiment tire (FIG. 2). Section height H is the mounted, inflated and unloaded section height of the run-flat tire 10. Section height H is in a range of approximately 96 to 98 percent of a cured section height of the tire.

The load supporting components (crescent-shaped members and carcass layers) cycle from tension to compression and back to tension as the tire rotates and the crown portion 14 contacts the ground surface 90. Therefore, crescent-shaped members and the carcass layers having both excellent tensile and excellent compression strength properties are preferred. The tension and compression physical properties of most non-reinforced rubber products used in tires are known to be approximately equal. The tensile strength properties of the carcass layers are much better than its compressive strength properties, due to the reduced strength of its reinforcing members in compression. Some reinforcing members are much better in compression than others. The preferred reinforcing members 63, 65, and 69 are cords made of any suitable material from the group consisting of nylon, rayon, aromatic polyamide and polyethylene napthalate. A hybrid reinforcing member which is more stable at higher temperatures is also within the scope of this invention. These reinforcing members 63,69 of the middle and inner carcass layers 62,68 (FIG. 5B) are supported by the adjacent crescent-shaped reinforcing members 54,56, and 57, and have an increased compressive strength as a result of this confinement.

The strength (modulus of elasticity) in compression of the middle and inner carcass layers 62,68 in the direction of the reinforcing members is from about 55 megaPascals (MPa) to about 95 MPa using a 1840 decitex 2 ply rayon reinforcing material. The rubber skim on the carcass layers are of a material standard in the industry. The preferred modulus of elasticity in compression for the middle and inner carcass layers 62,68 is at least 75 MPa, and the preferred material is rayon.

A critical performance characteristic of the run-flat tire 10 is the ability of the tire to achieve relatively high lateral forces without unseating from the rim 70. The essential components or features of the run-flat tire 10 of this invention, which are most helpful in achieving improved unseating performance during lateral cornering maneuvers of the vehicle included in each bead portion 20, are the rubber toe portion 28, the bead core 22, the rubber seat portion 26 and especially the rim seat ply 27. The rubber seat portion has a preferred tension modulus of elasticity at 10 percent strain in a range of approximately 6.5 to 9.0 megaPascals (MPa) and the rubber toe portion has a preferred tension modulus of elasticity at 10 percent unit strain in a range of approximately 45 to 60 MPa. Other components such as the crescent-shaped reinforcing members 54,56, and 57 and the bead filler 24 are also important, but somewhat less critical, in keeping the run-flat tire on the rim. However, all of these features contribute to the run-flat performance of the tire of the invention. Even without special modifications to the rim (i.e., using standard T&RA rim specifications) the tire of this invention will remain seated up to a lateral acceleration of at least 0.60 $g^x$ with nominal vehicle operation.

FIG. 4 shows the run-flat tire 10 in a deflected position, typical of the tire in a deflated condition. This deflection position will become deformed laterally (or axially) when the vehicle is cornering. The outer side (opposite the location of the turn axis or turn center of the vehicle trajectory) is critical as the tire is being forced to the inside of the rim 70. In this maneuver, the hard rubber toe portion 28 acts in compression and helps keep the bead portion 20 from being displaced to the interior of the rim 70. In a preferred embodiment, the rim seat ply 27 engages a hump 72 at the contact point 75 on the rim 70 which acts to apply a further restraining and compressive force to the rubber toe portion 28. The hard rubber toe portion 28 resists deformation and helps maintain the bead core 22 a fixed distance removed from the hump 72. The rubber toe portion 28 has a modulus of elasticity at 10 percent unit strain in a range of approximately 45 to 60 MPa, and preferably from 50 to 57 MPa.

To unseat the run-flat tire 10 from the rim 70, the bead core 22 must negotiate, or be displaced in an axial direction to a position axially inward of, the hump 72. In addition, the bead core 22 will rotate when it is displaced to a location over the hump 72 of the rim 70. Therefore, the tensile strength and torsional rigidity of the bead core 22 are important parameters in maintaining the tire on the rim 70, particularly during cornering maneuvers of the vehicle. The bead core 22 is preferably of a metallic or aromatic polyamide material. The tensile strength at one percent unit strain of the bead core is in a range of approximately 900 to 2500 Newtons per square millimeter and is preferably 2000 Newtons per square millimeter. The torsional stiffness of the bead core is the moment or torsion necessary to produce a rotation at a unit shear strain of 0.0436 radians (2.5 degrees). The torsional stiffness of the bead core of this invention is at least 90 Newton meters per radian and is preferably at least 125 Newton meters per radian for a 100 millimeter long test sample. Various bead core cross-sectional configurations are within the scope of this invention, such as circular and rectangular. The torsional or polar moment of inertia for the cross-sectional area of the bead core is at least about 125 millimeters to the fourth power and further shall be in the range to about 350 millimeters to the fourth power, and preferably at least 140 mm$^4$. These physical parameters are well known in the industry as defined herein and also defined by the American Society of Testing Materials (ASTM) of Philadelphia, Pa. in Standards D885 (page 255 item 3.1.17) and E6 (page 98 items 30 and 37).

TEST RESULTS

The run-flat tire of this invention exhibits improved vehicle performance over previously designed run-flat tires.

Critical ride comfort problems have been substantially resolved by providing a run-flat tire with three crescent-shaped reinforcing members. Lateral accelerations of the vehicle up to approximately 0.65 $g^s$ with an unmodified (standard) rim and up to the vehicle's lateral limit of approximately 0.85 $g^s$ with a modified rim (having a hump 72) have been achieved without the bead area 20 becoming unseated from the rim 70.

Five run-flat tires of the same P225/60 R16 size have been investigated to illustrate the performance improvements of the tire 10 of this invention. Tire A was the same tire as illustrated in FIG. 1 for the comparative tire. This tire is characterized by having two crescent-shaped reinforcing members with an inner carcass layer between the two crescent-shaped members. Tire B was the same as tire A except a steel cord tissue reinforced rubber ply has been added in the both lower sidewall and bead areas from the bead core radially outward to the median plane on the outside of the bead filler. Tires C, D and E are those of the invention as illustrated in FIG. 2. Tire C had a relatively thick first crescent-shaped member 54 being 12 percent thicker than the second and third crescent-shaped members. Tire D had a first crescent-shaped member thickness 92 percent of that for tire C and tire E had a first crescent-shaped member thickness 85 percent of that of tire C. The following table illustrates those performance parameters where a substantial improvement was obtained for tires C, D and E over the comparative tires A and B. Values for ride comfort and handling are subjective values based on a scale of 1 to 10, as used by automobile manufacturers. A change of ¼ point is noticable to a trained test driver where a change of 1 point is very noticable to any unexperienced driver. Subjective value changes of 1 point in ride comfort and handling are very difficult to achieve in the tire industry. The tire A was selected as a reference (REF) and the greater the positive change from the reference value the better the tire performs.

Durability is based of tire A going 20–40 (say 30) miles with a load of 1330 pounds at 55 miles per hour, and the higher the number the better. A normalized value of 1.0 was used for tire A. High speed limit is a standard roadwheel loaded tire test by manufacturers and normalized values are base on a reference value for tire A of 100. Uniformity is for VRH1 in kilograms, also standard in the industry, and is based on tire A having a normalized value of 1.0; where the lower the value the better the uniformity. Onset of failure is based on the time from a vibration noticeable by the operator in the vehicle to the time the operator must stop; with tire A set at a normalized value of 1.0, and the higher the value the better.

It is apparent from this table that the tires C, D and E of this invention are superior to the comparative tires A and B in these performance areas. Tire E with a relatively thin first crescent-shaped reinforcing member is best in ride comfort and handling as well as uniformity. Tire C having a relatively thick first crescent-shaped member has better durability at zero psi inflation pressure, and the onset of failure is more gradual for this tire C.

From the above description of the preferred embodiments of the invention, those skilled in the art will perceive other improvements, changes and modifications within the skill of the art which are essentially covered by the appended claims.

Having described the preferred embodiments, what is claimed is:

1. A tire for mounting on a rim of a vehicle which tire is capable of sustaining vehicle loads at a contact patch in an effective manner with the loss of inflation pressure comprising:

a crown portion having a tread;

a belt package located radially inward of said tread;

an innerliner portion on the interior surface of the tire;

a pair of bead portions axially spaced apart and each having a bead core and a bead filler;

a pair of axially spaced apart load bearing sidewall portions wherein each sidewall portion is disposed radially between a respective lateral edge of said crown portion of the tire and a respective bead portion, each sidewall portion having first and second crescent-shaped reinforcing members disposed outside said innerliner portion and a third crescent-shaped reinforcing member extending radially outward from and contiguous with said bead filler, and a sidewall rubber portion;

an outer carcass layer disposed radially inward of the belt package and axially inward of each sidewall rubber portion, said outer carcass layer extending radially inward to at least a point axially outward and adjacent to each said bead core;

a middle carcass layer disposed to the inside of said outer carcass layer and extending under the crown portion and radially inward between the second member and the third member of the crescent-shaped reinforcing members in each sidewall to each bead portion and continues around said bead core with turned-up portions from inside to outside in such a manner to at least partially encompass said bead core and a respective bead filler; and an inner carcass layer disposed to the inside of said middle carcass layer and extending under the crown portion

TABLE

| Performance Values | TIRES OF THE INVENTION | | | | |
|---|---|---|---|---|---|
| | TIRE A | TIRE B | TIRE C | TIRE D | TIRE E |
| Overall Ride | REF | −1 | = | +1 | +1.5 |
| Rough Road | REF | −1 | = | +½ | +1.5 |
| Ride Bounce | REF | −½ | = | = | +1 |
| Small Impact | REF | −½ | = | +½ | +1 |
| Large Impact | REF | −1 | = | +1 | +1.5 |
| 0 psi durability | 1.0 | 1.0 | 2.5 | 1.8 | 1.5 |
| High speed limit | 100 | 110 | 110 | 110 | 110 |
| Uniformity VRH1 | 1.00 | 1.20 | 0.93 | 0.85 | 0.70 |
| Onset of Failure | 1.0 | 1.0 | 4.0 | 3.6 | 3.2 | and radially inward between the first member and the second member of the crescent-shaped reinforcing members in each sidewall to at least a point axially inward and adjacent to each said bead core, said carcass layers each having a plurality of substantially parallel reinforcing members and a curvilinear configuration.

2. The tire set forth in claim 1, wherein said belt package further comprises at least two belts and a cap ply, wherein a wider inner belt extends beyond the lateral edge of at least one outer belt, said belts having their outer surface area covered by the cap ply with a width to extend beyond each lateral edge of the belts, said belt package being symmetrical with respect to a midcircumferential plane.

3. The tire set forth in claim 2, wherein said belt package has substantially parallel reinforcing members in each of the belts made of either a steel material or an aromatic polyamide material disposed at an acute angle with respect to a midcircumferential plane of the tire.

4. The tire set forth in claim 1, wherein said first, second and third crescent-shaped reinforcing members are approximately equal in shape and thickness and are made of substantially the same material having a modulus of elasticity in compression at 10 percent unit strain in the range of about 7.0 to about 15.0 megaPascals (MPa).

5. The tire set forth in claim 1, wherein said first crescent-shaped reinforcing member between the innerliner portion and inner carcass layer, said second crescent-shaped reinforcing member between the inner carcass layer and the middle carcass layer and said third crescent-shaped reinforcing member between the middle carcass layer and the outer carcass layer have a Shore A hardness in a range of approximately 70 to 90 and a modulus of elasticity in compression at 10 percent unit strain in a range of approximately 7.0 to 15.0 megaPascals.

6. The tire set forth in claim 5, wherein each bead filler is integral with the third crescent-shaped reinforcing member and has a Shore A hardness in a range of approximately 70 to 90 and a modulus of elasticity in compression at 10 percent unit strain in a range of approximately 7.0 to 15.0 megaPascals.

7. The tire set forth in claim 5, wherein each bead filler has an apex radially outward of the bead core extending radially to a distance of approximately 45 to 60 percent of a section height from a bead core reference, said bead filler having a modulus of elasticity in compression at 10 percent unit strain in a range of approximately 7.0 to 60.0 megaPascals.

8. The tire set forth in claim 1, wherein a thickness of each load bearing sidewall portion including a sidewall rubber portion, the inner, middle and outer carcass layers, the first, second and third crescent-shaped reinforcing members, the bead filler and the innerliner portion is approximately constant over its radial extent and such sidewall portion has a width of about 7 percent to about 11 percent of a section width of the tire.

9. The tire set forth in claim 1, wherein each bead portion further includes a rubber support portion, a rim seat ply, a first rubber seat portion to support the seat ply and a second rubber toe portion located axially and radially inward of the bead core, said rubber support portion and said toe portion also helping to support the seat ply and keep the tire on the rim by contact of the seat ply with the rim and a flange of the rim at a tire/rim interface.

10. The tire set forth in claim 9, wherein said rim seat ply has square woven fabric reinforcing members made of any suitable material from the group consisting of nylon, polyester, rayon and aromatic polyamide, said first rubber seat portion being located radially outward and axially inward of the rim seat ply and having a tension modulus of elasticity at 10 percent unit strain in a range of approximately 6.5 to 9.0 megaPascals (MPa) and said second rubber toe portion being located axially and radially inward of the bead core and having a tension modulus of elasticity at 10 percent unit strain in a range of approximately 45 to 60 MPa.

11. The tire set forth in claim 1, wherein said bead core is made from a metallic or an aromatic polyamide material having a tensile strength at one percent unit strain in a range of approximately 900 to 2500 Newtons per square millimeter and a torsional rigidity of at least 90 Newton meters per radian for a test sample 100 millimeters long, whereas each bead portion of said run-flat tire remains on the rim during maneuvers of the vehicle.

12. The tire set forth in claim 11, wherein the bead core has a torsional moment of inertia of its cross-sectional area of at least about 125 millimeters to the fourth power.

13. The tire set forth in claim 1, wherein reinforcing members of said outer carcass layer are cords made of any suitable material from the group consisting of nylon, polyester, rayon, aromatic polyamide and polyethylene napthalate.

14. The tire set forth in claim 1, wherein the modulus of elasticity of the middle and inner carcass layers in compression at 10 percent unit strain is at least equal to 75 megaPascals (MPa) when confined between the first, second and third crescent-shaped reinforcing members.

15. The tire set forth in claim 14, wherein reinforcing members of said middle and inner carcass layers are cords made of any suitable material from the group consisting of rayon, nylon, aromatic polyamide and polyethylene napthalate.

16. The tire set forth in claim 1, wherein the carcass turn-up portions of said middle carcass layer extend outward a radial distance from a bead reference in each bead portion a distance in a range of 25 to 40 percent of a section height of said tire after loss of inflation pressure and with a nominal load as initially supported by the tire when inflated.

17. The tire set forth in claim 1, wherein said carcass turned-up portions of said middle carcass layer extend radially outward from a bead reference in each bead portion a distance in the range of 25 to 50 percent of a section height of said tire when cured.

18. The tire set forth in claim 1, wherein a maximum thickness of each one of the first, second and third crescent-shaped reinforcing members is in a range of values of about 3 millimeters to about 6 millimeters.

19. A tire and rim system capable of sustaining vehicle loads in an effective manner with the loss of tire inflation pressure comprising:

a crown portion of the tire having a tread;

a pair of tire bead portions each having a bead core, a bead filler, a rim seat ply in contact with the rim, a first rubber seat portion and a second rubber toe portion located axially and radially inward of the bead core;

a tire outer carcass layer disposed radially inside of the crown portion and extending radially inward at both ends to at least the radial extent of a respective bead core;

a pair of axially spaced apart tire load bearing sidewall portions wherein each sidewall portion is disposed radially between a respective lateral edge of said crown portion of the tire and a respective bead portion, each sidewall portion having first, second and third crescent-shaped reinforcing members disposed between a sidewall rubber portion and an innerliner portion;

a tire middle carcass layer disposed inside said outer carcass layer and positioned between the second member and the third member of the crescent-shaped reinforcing members in each sidewall and having a carcass turned-up portion at each end extending from inside to outside around each bead core in such a manner to at least partially encompass said bead core and a respective bead filler;

a tire inner carcass layer disposed inside said middle carcass layer and positioned between the first member and the second member of the crescent-shaped reinforcing members in each sidewall and extending radially inward to at least a point axially interior and adjacent to each bead core, said carcass layers each having a plurality of substantially parallel reinforcing members and a curvilinear configuration and each carcass layer being continuous from bead to bead, wherein the position of said middle and inner carcass layers produces a stepwise radial stress distribution between said first, second and third crescent-shaped reinforcing members axially across the middle and inner carcass layers on a median plane, said median plane being adjacent a central radial plane of a contact patch; and a rim having a hump disposed at the axial innermost end of each rim seat ply of the mounted tire, wherein each said hump may engage the rim seat ply and whereas the tire remains seated on said rim of the vehicle during vehicle maneuvers as well as during straight ahead running.

20. The tire and rim system set forth in claim 19, wherein a distance from the center of the bead core to a base point on the hump of said rim is in a range of 12 to 16 millimeters.

21. The tire and rim system set forth in claim 19, wherein said bead core is made from a metallic or an aromatic polyamide material having a torsional rigidity of at least 90 Newton meters per radian for a test sample 100 millimeters long and a tensile strength at one percent unit strain in a range of approximately 900 to 2500 Newtons per square millimeter.

22. The tire and rim system set forth in claim 21, wherein said bead core has a torsional moment of inertia of its cross-sectional area of at least 125 millimeters to the fourth power.

23. The tire and rim system set forth in claim 19, wherein said second rubber toe portion has a modulus of elasticity in tension at 10 percent unit strain in a range of approximately 45 to 60 megaPascals.

\* \* \* \* \*